Nov. 11, 1958  R. P. SHANNON  2,859,508
GEAR SHAVING CUTTER
Filed Feb. 20, 1956

INVENTOR.
ROLAND P. SHANNON
BY Whittemore,
Hulbert & Belknap
ATTORNEYS

United States Patent Office 2,859,508
Patented Nov. 11, 1958

2,859,508

GEAR SHAVING CUTTER

Roland P. Shannon, Muncie, Ind., assignor to National Broach & Machine Company, Detroit, Mich., a corporation of Michigan Application February 20, 1956, Serial No. 566,635

6 Claims. (Cl. 29—103)

The present invention relates to a gear shaving cutter.

It is an object of the present invention to provide a gear shaving cutter adapted to perform a more uniform and efficient cutting action when employed in diagonal gear shaving.

More specifically, it is an object of the present invention to provide a gear shaving cutter in the form of a gear having teeth provided with grooves extending from root to top at the sides thereof to form cutting edges in which the cutting edges are spaced substantially closer together adjacent the end portions of the teeth than centrally thereof.

Other objects and features of the invention will become apparent as the description proceeds, especially when taken in conjunction with the accompanying drawings, wherein.

Crossed axes gear shaving as commonly practiced today involves meshing a gear to be finished with a gear-like shaving cutter with the axes of the gear and cutter crossed at an angle between 3 and 30 degrees. One of the members, usually the gear member, is mounted for free rotation. The cutter is then driven in rotation and the gear is driven solely as a result of the meshed relation with the cutter. Cutting edges are provided in the sides or flanks of the teeth of the cutter. Due to the crossed axes relationship, as a result of which the gear and cutter are revolving in different planes, there is a crossed sliding action between the surfaces of the gear and cutter which results in the cutting edges on the teeth of the cutter removing metal from the surfaces of the gear teeth.

As is well understood, initial contact between the teeth of a gear and gear-like cutter, if these teeth are unmodified from end to end, takes place in a limited zone adjacent a line perpendicular to the axes of both the gear and cutter which line is referred to herein as the common normal to the axes. In order to distribute the cutting action of the cutter longitudinally from end to end of the gear teeth it is necessary to provide a relative traverse between the gear and cutter as the parts are rotated. It is essential that this relative traverse takes place in a plane parallel to the axes of both the gear and cutter. In the simplest case, this traverse may be in a direction parallel to the axis of the gear. More recently however, improved results and particularly increased rapidity of the finishing action, have been obtained when the direction of relative traverse is in a direction in the aforesaid plane which is oblique or diagonal with respect to both the axis of the gear and the axis of the cutter.

Figure 1:
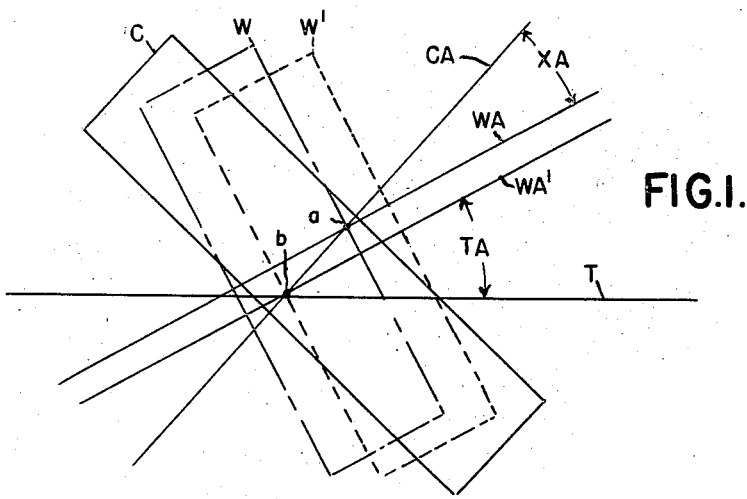
Figure 1 is a diagrammatic view illustrating the relationship between a work gear and cutter meshed at crossed axes and operated to perform a gear finishing operation known as diagonal gear shaving.

Referring now to Figure 1, the relationship between a cutter C and a work piece W is illustrated diagrammatically. It may be assumed that the cutter is fixedly mounted in an adjusted position in which its axis CA extends as indicated. At this time the work gear W is brought into full line position in mesh with the cutter, the axis of the work gear being indicated at WA. The teeth of the cutter and work gear are of such helix angle that the cutter and gear mesh when their axes are crossed at the crossed axis angle XA. At this time it will be observed that a line perpendicular to the cutter axis CA and the work axis WA occupies a position $a$ in Figure 1 and that this position is at the right hand side of the work gear W. With the work gear and cutter in the illustrated position, the cutter may be driven in rotation at cutting speeds and will drive the freely mounted work gear W due to their meshing relation.

At this time if the work gear W is moved to the right in the path designated T it will eventually reach the position shown in dotted lines and designated W'. At this time the axis of the work gear is designated WA' and it will be observed that it intersects the axis of the cutter at the point $b$. It will further be observed that the point $b$. It will further be observed that the point $b$ is at the left hand side of the work gear in the position W'. Accordingly, traverse of the work gear from the full line position to the dotted line position designated W' will have caused the common normal to the axes of the gear and cutter to shift from the point $a$ to the point $b$, or in other words, to move from one side of the work gear to the other side thereof. Accordingly, traverse of the work gear as described relative to the cutter results in finishing the teeth of the work gear uniformly from end to end.

It is also important to observe that in the above operation, the point $a$ is located adjacent the upper right hand side of the cutter C and the point $b$ is adjacent the lower left hand side of the cutter C. This means that during the traverse of the work gear W from the full line position to the dotted line position indicated at W', the zone on the teeth of the cutter which is cutting to greatest depth shifts from the point $a$ to the point $b$. It will of course be apparent that with the traverse angle TA of different magnitude or with a different crossed axes relationship, or with different width gear and/or cutter, the points $a$ and $b$ may lie at or very close to the side edge of the cutter C. It is only when the direction of traverse T is parallel to the axis of the work gear WA that there is no shifting of the center of crossed axes relative to the cutter.

Figure 2:
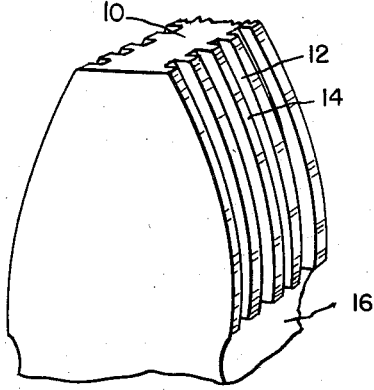
Figure 2 is an elevational view of a tooth of a gear shaving cutter.

Referring now to Figure 2, there is illustrated a tooth 10 of a gear shaving cutter. The tooth as illustrated, is of involute form and has its opposite sides interrupted by a multiplicity of grooves 12 leaving upstanding ribs 14 therebetween, the grooves 12 and the ribs 14 being more clearly illustrated in Figure 3. Adjacent the roots of the teeth 10 there is provided an arcuate undercut or channel 16.

As known to the prior art, the grooves 12 and channels 14 have ordinarily been of constant width from end to end of a cutter tooth.

It has been found that when shaving gear teeth with diagonal traverse as described above, and when the operation is carried out in the shortest possible cycle so as to increase production, a plus involute tip occurred at the acute corners of helical gear teeth. It was an effort to eliminate this difficulty which led to the present invention.

It has been found that the presence of the plus involute tip at the acute corners of helical gears when the gears are shaved at a short cycle with diagonal traverse is due to the rapid movement of the common normal across the length of the gear teeth. This results in the cutter leaving the end of the gear teeth too rapidly for the cutter to perform and complete its correct operation. In order to overcome this difficulty, the present invention provides a cutter having an increased number of cutting edges adjacent the end portions of the cutter teeth. Stated another way, the cutting edges adjacent the end portions of the cutter teeth are spaced apart less distance than the spacing between cutting edges adjacent the central portion of the cutter teeth. This type of cutter allows the rapid diagonal feed and accomplishes the desired result of eliminating the plus involute tip at the corners of the helical gear.

Figure 3:
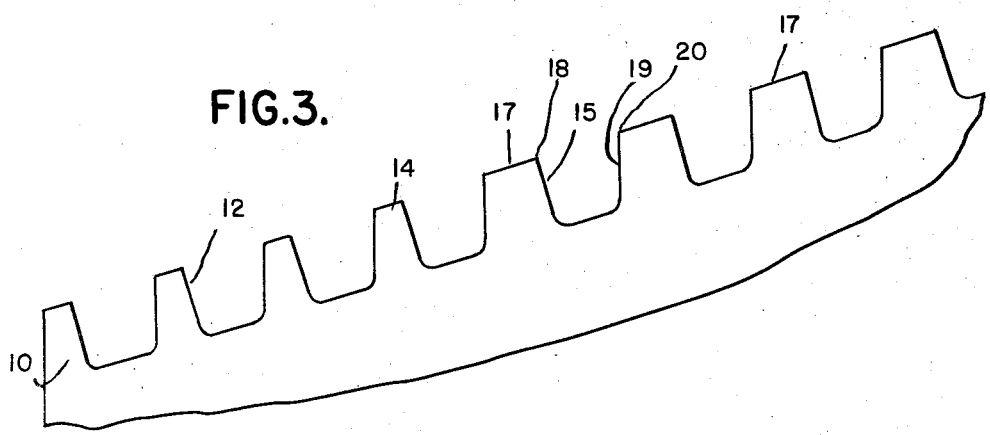
Figure 3 is an enlarged fragmentary sectional view showing the provision of cutting edges on a tooth of a gear shaving cutter.

Referring now to Figure 3 there is illustrated diagrammatically a portion of a cutter tooth 10. The grooves 12 are formed in the surface of the cutting teeth and leave the ribs 14 therebetween. Since the tooth 10 is illustrated as helical, the grooves 12 are preferably provided with side walls 15 which are inclined to the plane of the cutter so as to provide substantially perpendicular intersection with the side surfaces 17 of the teeth, hence providing cutting edges 18 which include approximately 90 degrees. The opposite side 19 of the grooves 12 preferably occupies the plane of the cutter and hence intersects the surface 17 of the cutter teeth in obtuse included angle cutting edges 20.

Generally, the width of the grooves 12 is kept approximately constant and the differential spacing of the cutting edges is accomplished by variation in the width of the ribs 14. Thus, in Figure 3 it will be observed that the four ribs next adjacent the ends of the cutter teeth are of very substantially less width than the usual ribs constituting the central portion of the cutter teeth. Attention is particularly directed to the fact that the end rib is of substantially no greater width than the adjacent ribs. Mention is made of this fact because in some prior cutters it was common practice to provide a relatively thick end rib for the purpose of protecting the cutter teeth from breakage.

By way of a specific example, a cutter of 17 degrees helix angle having 15 grooves or gashes was provided. These grooves or gashes were of the type illustrated in Figure 3 having inclined side walls so as to avoid the formation of a cutting edge having an arcuate included angle. The four grooves or gashes adjacent each end of the cutter teeth had a normal width (as measured perpendicular to the length from end to end of the cutter teeth) of .041 inch. The seven grooves intermediate the four end grooves had a normal width of .043 inch. The two end ribs or lands at the extreme ends of the cutter had a normal width of .0185 inch. The next three ribs or lands adjacent the end lands had a normal width of .017 inch. The eight ribs or lands at the central portion of the cutter teeth had a normal width of .029 inch. In all cases the width of lands or ribs and the width of grooves or gashes was measured at .006 inch below the surface.

In another specific example, a 10 degree left hand helix angle cutter was provided in which case also grooves or gashes were formed with opposite side walls inclined to avoid formation of cutting edges having acute inclined angles. The four gashes next adjacent both ends of the cutter teeth had a normal width of .043 inch. The eight intermediate gashes at the center of the cutter teeth had a normal width of .042 inch. The grooves or gashes are separated so that the four ribs or lands next adjacent the ends of the cutter teeth had a normal width of .019 inch. The nine intermediate ribs or lands adjacent the center of the cutter teeth had a normal width of .029 inch.

Both of these cutters have been operated in commercial production with complete satisfaction and have eliminated the high involute tip at the acute corners of the helical gear teeth produced by diagonal shaving with rapid diagonal traverse.

In general, the width of the grooves or gashes will be approximately uniform throughout the length of the teeth and will be approximately .040–.045 inch. The differential spacing of the cutting edges is therefore accomplished by a difference in the thickness of the ribs or lands and in general, the ribs or lands adjacent the ends of the teeth will have a normal width approximately .015–.020 inch, and the width of the ribs adjacent the central portion of the cutter is approximately .025–.035 inch.

Not only does the provision of relatively narrow ribs or lands adjacent the end portions of the cutter teeth provide additional cutting edges, but also the reduced width of these lands provides less area in contact with the surface of the gear teeth, and hence a freer cutting action is to be expected. In any case, the objectionable high involute tip at the acute angle corner of the gear teeth is avoided by the use of the cutter disclosed herein, without other change in the method of diagonal gear shaving. Thus, by employing the cutter disclosed herein, the time cycle of finishing helical gears may be reduced, since the rate of traverse or diagonal feed may be increased when shaving helical gears without at the same time introducing the objectionable high involute tip thereon.

The drawings and the foregoing specification constitute a description of the improved gear shaving cutter in such full, clear, concise and exact terms as to enable any person skilled in the art to practice the invention, the scope of which is indicated by the appended claims.

What I claim as my invention is:

1. A gear shaving cutter for use in diagonal gear shaving comprising a cylindrical gear-like body having teeth extending between opposite ends thereof, the teeth of said cutter having grooves extending from root to top of said teeth leaving ribs therebetween, the intersections between the side surfaces of said grooves and the sides of said teeth forming sharp cutting edges, the sum of the width of an adjacent rib and groove adjacent the central portion of said teeth being greater than the sum of the width of an adjacent rib and groove adjacent the ends of said teeth.

2. A gear shaving cutter for use in diagonal gear shaving comprising a cylindrical gear-like body having teeth extending between opposite ends thereof, the teeth of said cutter having grooves extending from root to top of said teeth leaving ribs therebetween, the intersections between the side surfaces of said grooves and the sides of said teeth forming sharp cutting edges, the grooves being of substantially uniform normal width from end to end at the teeth, the ribs adjacent the central portion of said teeth being wider than the ribs adjacent the ends of said teeth.

3. A cutter as defined in claim 2 in which all of said grooves are approximately .040–.045 inch normal width, the ribs adjacent the ends of said cutter teeth have a normal width of approximately .015–.020 inch, and the width of the ribs adjacent the central portion of said cutter teeth is approximately .025–.035 inch.

4. A gear shaving cutter for use in diagonal gear shaving comprising a cylindrical gear-like body having teeth extending between opposite ends thereof, the teeth of said cutter having cutting edges at the sides thereof extending from root to crest thereof substantially in the plane of rotation, the corresponding cutting edges being substantially more closely spaced adjacent the ends of the cutter teeth than centrally thereof.

5. A cutter as defined in claim 1 in which the width of the end ribs at the ends of said teeth is equal to that of the other ribs adjacent the ends of the cutter teeth.

6. A cutter as defined in claim 1 in which the width of the end ribs at the ends of said teeth is slightly greater than that of the other ribs adjacent the ends of the cutter teeth but substantially less than that of the ribs adjacent the center of the cutter teeth.

References Cited in the file of this patent

UNITED STATES PATENTS

| | | |
|---|---|---|
| 2,126,178 | Drummond | Aug. 9, 1938 |
| 2,278,737 | Praeg | Apr. 7, 1942 |
| 2,295,148 | Witham | Sept. 8, 1942 |
| 2,322,793 | Drummond | June 29, 1943 |
| 2,329,284 | Mentley | Sept. 14, 1943 |